US012702994B2

(12) United States Patent
Cochran

(10) Patent No.: US 12,702,994 B2
(45) Date of Patent: Aug. 11, 2026

(54) REMOTE DEPLOYMENT SAFETY SYSTEM AND DETERRENT DEVICES

(71) Applicant: Christopher Cochran, Bethlehem, PA (US)

(72) Inventor: Christopher Cochran, Bethlehem, PA (US)

( * ) Notice: Subject to any disclaimer, the term of this patent is extended or adjusted under 35 U.S.C. 154(b) by 267 days.

(21) Appl. No.: 18/639,237

(22) Filed: Apr. 18, 2024

(65) Prior Publication Data

US 2024/0351058 A1 Oct. 24, 2024

Related U.S. Application Data

(60) Provisional application No. 63/460,331, filed on Apr. 19, 2023.

(51) Int. Cl.
*B05B 12/08* (2006.01)

(52) U.S. Cl.
CPC .................................... *B05B 12/08* (2013.01)

(58) Field of Classification Search
CPC .. E05G 1/12; E05G 1/14; B05B 12/08; G08B 15/02
USPC ............................................................ 109/29
See application file for complete search history.

(56) References Cited

U.S. PATENT DOCUMENTS 2,500,050 A * 3/1950 Wittel ...................... G03B 3/02 359/830
4,370,675 A * 1/1983 Cohn ................... H04M 11/025 348/706
7,015,943 B2 * 3/2006 Chiang ............ G08B 13/19658 348/143
8,144,183 B2 * 3/2012 Carter .................. H04M 11/025 348/14.06
10,011,352 B1 * 7/2018 Dahlstrom ............ B05B 13/005
10,325,466 B2 * 6/2019 Cleary ............. G08B 13/19656
11,184,589 B2 * 11/2021 Scalisi ............. G08B 13/19684
11,308,782 B1 * 4/2022 Stevens ..................... G08B 7/06
2005/0057361 A1 * 3/2005 Giraldo ............ G08B 13/19684 340/539.13
2010/0225455 A1 * 9/2010 Claiborne ................ G08B 3/10 340/384.7
2011/0090085 A1 * 4/2011 Belz ................. H04N 21/44218 348/143
2015/0035987 A1 * 2/2015 Fernandez ............. H04N 7/186 348/156
2016/0105644 A1 * 4/2016 Smith .............. G08B 13/19667 348/159

FOREIGN PATENT DOCUMENTS

CA 2684367 A1 * 11/2008 ............. G08B 15/02
WO WO-2009078013 A2 * 6/2009 .......... A01M 31/002
WO WO-2010045711 A1 * 4/2010 ............. G08B 15/02

* cited by examiner

*Primary Examiner* — Suzanne L Barrett
(74) *Attorney, Agent, or Firm* — IP Works Law PLLC

(57) ABSTRACT

A deterrent device including a front surface having plurality of openings, a cap unit including a spray nozzle inserted into at least one opening, a camera position at the center of the front surface, at least one speaker on the front surface, at least one microphone on the front surface, and a control unit that monitors the camera and provides an audible sound when motion is detected and sprays fluid from at least one nozzle if motion is detected after the audible tone is made.

18 Claims, 9 Drawing Sheets

REMOTE DEPLOYMENT SAFETY SYSTEM AND DETERRENT DEVICES

CROSS-REFERENCE TO RELATED APPLICATIONS

This is application claims the benefit of and priority from U.S. Provisional Patent Application No. 63/460,331, filed Apr. 19, 2023, which is fully incorporated herein by reference.

BACKGROUND OF THE INVENTION

Securing property and personal belongings is a critical need for most people. Many securing and locking devices exist to prevent intruders from entering into areas where personal property is kept. However, these securing and locking devices can be compromised by an uninterrupted intruder. In addition, surveillance systems can monitor secured areas and notify third parties of the presence of an unauthorized person, but without a physical presence at the location, the surveillance systems do nothing more that record the incident when it happens without deterring any nefarious activity.

A need exists for a system that will monitor a secured area and provide a deterrent against nefarious activity.

BRIEF SUMMARY OF THE INVENTION

This summary is provided to introduce a selection of concepts in a simplified form that are further described in the detailed description of the disclosure. This summary is not intended to identify key or essential inventive concepts of the claimed subject matter, nor is it intended for determining the scope of the claimed subject matter.

One embodiment of the present disclose includes a deterrent device having a front surface having plurality of openings, a cap unit including a spray nozzle inserted into at least one opening, a camera position at the center of the front surface, at least one speaker on the front surface, at least one microphone on the front surface, and a control unit that monitors the camera and provides an audible sound when motion is detected and sprays fluid from at least one nozzle if motion is detected after the audible tone is made.

In another embodiment, the control unit converts sound captured from the microphone to a digital format.

In another embodiment, the control unit transfers the digitized audio to an external device via a communication unit in the control unit.

In another embodiment, the control unit transmits video from the camera to an external device via a communication unit.

In another embodiment, a memory card slot capable of accepting a memory card for storage of information from the control unit is on the front surface.

In another embodiment, the audible sound is a recorded audio signal warning of a potential spray event.

In another embodiment, the control unit controls the speakers to allow a user to speak through the speakers via an external device.

Another embodiment includes a mounting bracket having a threaded ring that engages an interior threaded ring on the back of the deterrent device.

Another embodiment includes a rubber coating applied to the periphery of the front surface.

In another embodiment, each nozzle is connected to a canister containing a liquid.

Another embodiment of the present disclosure includes a method of performing a deterrent action including the steps of monitoring for motion using a camera attached to the front surface of a deterrent unit via a control unit connected to the camera, sending an audible sound from the control unit via speakers on the front of the deterrent unit when motion is detected, capturing sound on the control unit via at least one microphone on the front surface, spraying fluid from at least one nozzle on the front surface of the deterrent unit controlled by the control unit if motion is detected after the audible tone is made.

Another embodiment includes the step of converting sound captured from the microphone to a digital format.

Another embodiment includes the step of transferring the digitized audio to an external device via a communication unit in the control unit.

Another embodiment includes the step of transmitting video from the camera to an external device via a communication unit.

Another embodiment includes the step of inserting a memory card into a memory card slot on the front surface for storage of information from the control unit.

In another embodiment, the audible sound is a recorded audio signal warning of a potential spray event.

Another embodiment includes the step of controlling the speakers via the control unit to allow a user to speak through the speakers via an external device.

In another embodiment, the deterrent device is mounted to a mounting bracket having a threaded ring that engages an interior threaded ring on the back of the deterrent device.

In another embodiment, a rubber coating is applied to the periphery of the front surface.

Another embodiment includes the step of connecting each nozzle to a canister containing a liquid.

DETAILED DESCRIPTION OF THE INVENTION

The system comprises a mounting connected to a deterrent unit. The deterrent unit includes nozzles configured to discharge a mist of a material that incapacitates a target for a period of time. The deterrent unit may include a speakers or other sound generating devices to warn potential targets of the potential mist. The mounts for the deterrent device may vary depending on the use of the spray dispensing unit.

Figure 1:
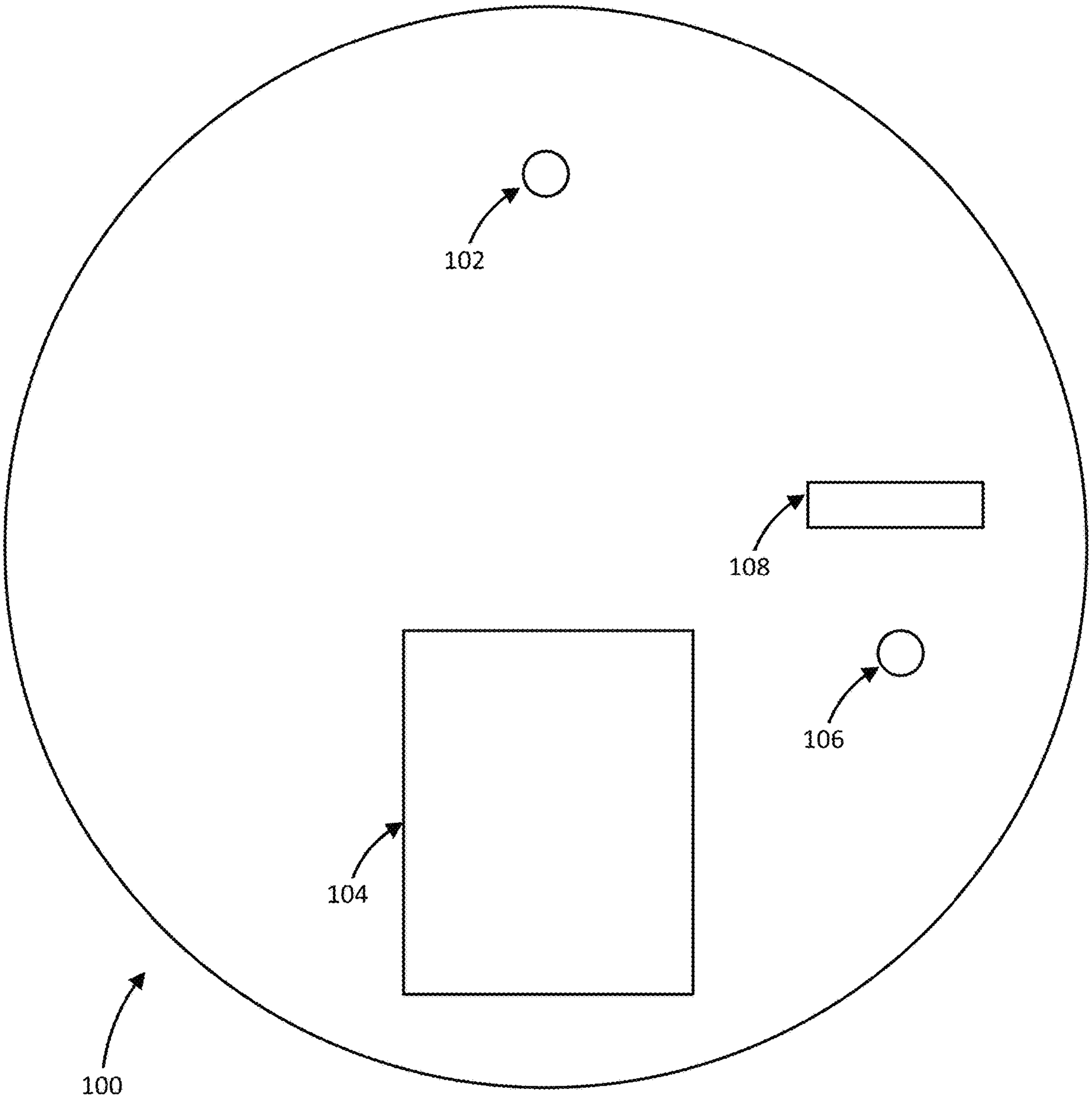
FIG. 1 depicts a rear view of one embodiment of the deterrent device for the remote deployment safety system.

FIG. 1 depicts a rear view of one embodiment of the deterrent device 100 for a remote deployment safety system. The deterrent device 100 includes a reset button 102 that is configured to reset an internal control board (not shown) inside the deterrent device 100. The reset button 102 may be a momentary switch, a locking switch or a toggle switch. When the switch is engaged the switch will initiate a control sequence in the control board (not shown) that controls the deterrent device 100. When the switch is engaged for a first time period, the control board may erase all previously held settings and reset the control board to its initial settings. When the switch is engaged for a second time period, the control board may enter into a configuration mode where different characteristics of the deterrent device 100 may be configured. The characteristics may include, but are not limited to, the duration of each spray, the triggering event to initiate a spray, the location of a sound file, a time delay before the spray occurs or any other characteristic of the deterrent device 100.

The deterrent device 100 may be powered by a battery unit 104. The battery unit 104 may accommodate any type of batteries including lithium ion batteries and nickel cadmium batteries. The deterrent device 100 includes a power connection 106 to connect the deterrent device 100 to a power source. In one embodiment, the batteries in the battery unit 104 are recharged by the power supply connected to the deterrent device 100 via the power connection 106. Consistent with this embodiment, the batteries in the battery compartment act as a backup power source to the power supplied via the power connection 106. A memory chip unit 108 allows for remote memory cards to be inserted into the deterrent device 100 for storage of information from the control board.

Figure 2:
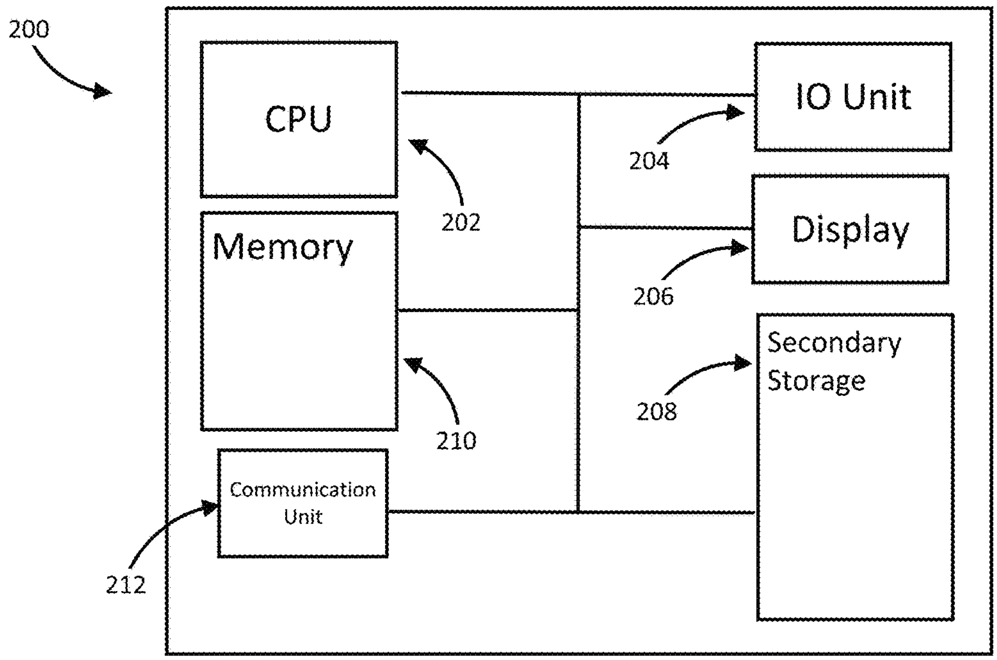
FIG. 2 depicts a schematic representation of the control board 200 used to control the deterrent system.

FIG. 2 depicts a schematic representation of the control board 200 used to control the deterrent system 100. The control board 200 includes a processor 202, a network I/O unit 204, a display unit 206, a secondary storage unit 208, and memory 210 and a communication unit 212. In one embodiment, the processor 202 may be a central processing unit ("CPU"), an application specific integrated circuit ("ASIC"), a microprocessor or any other suitable processing device. The memory 210 may include a hard disk, random access memory, cache, removable media card inserted into the memory chip unit 108, mass storage or configuration suitable as storage for data, instructions, and information. In one embodiment, the memory 210 and processor 212 may be integrated. The memory 210 may use any type of volatile or non-volatile storage techniques and mediums. The communication unit 212 may be a network interface card, a plain old telephone service ("POTS") interface card, an ASCII interface card, or any other suitable network interface device. The IO device 204 may connect to the reset button 102 and other devices connected to the deterrent device 100.

Figure 3:
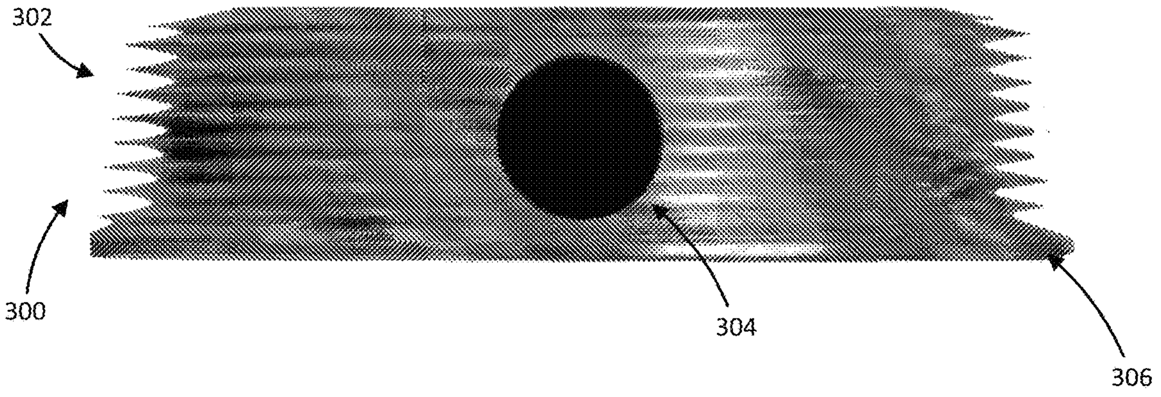
FIG. 3 depicts a side view of a covering device for the deterrent device.

FIG. 3 depicts a side view of a covering device for the deterrent device 100. The covering device 300 includes a plurality of threads 302 that are configured to engage threads in an opening in the deterrent device 100. The threads 302 may be covered by a rubber grommet or coating 304 to create a waterproof seal for the opening. The front portion of the covering device 300 includes a ledge 306 that provides an overlap between the periphery of the opening and the threaded portion 302 of the covering device 300.

Figure 4:
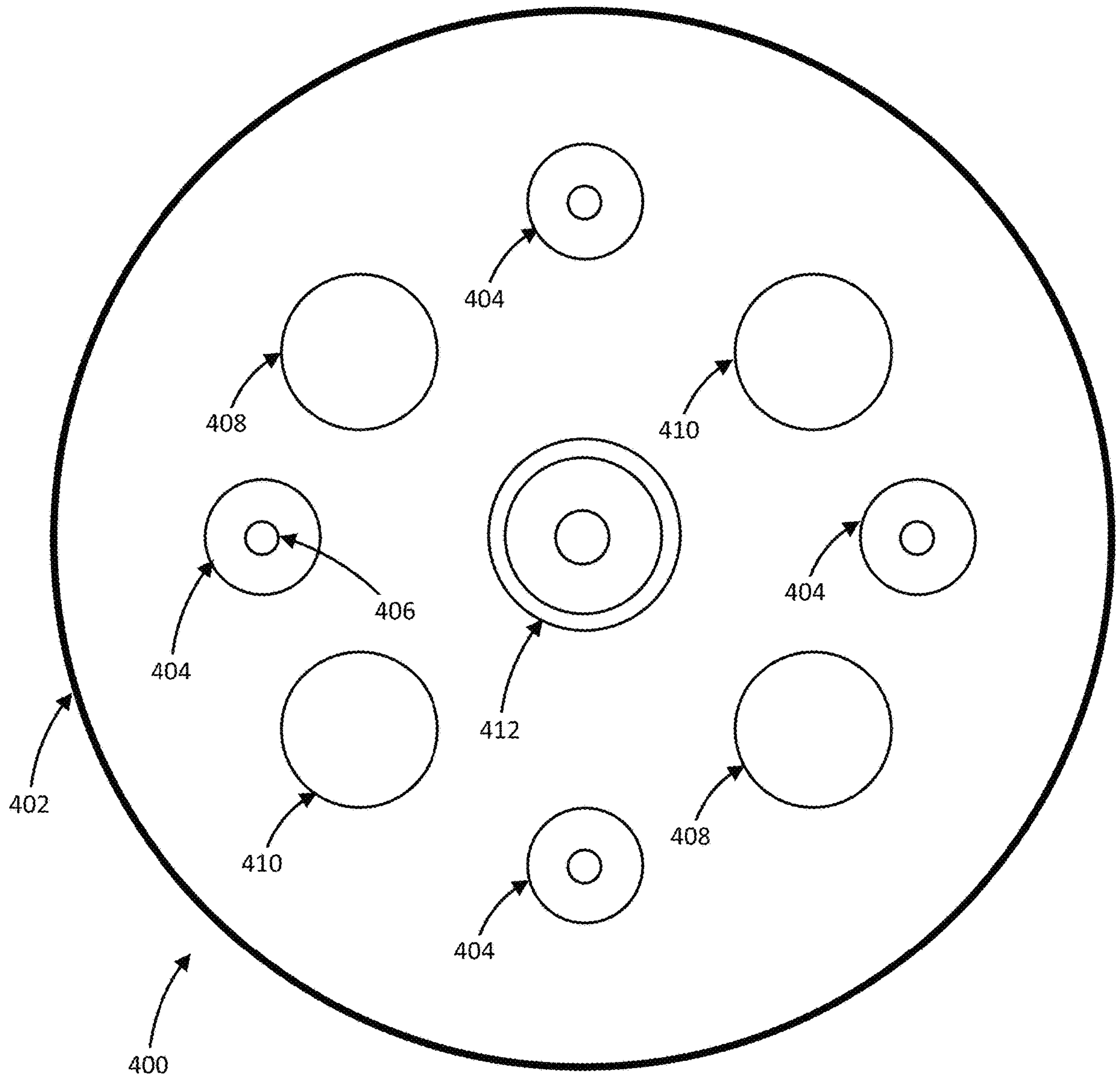
FIG. 4 depicts a front view of one embodiment of the deterrent system.

FIG. 4 depicts a front view of one embodiment of the deterrent system 100. The periphery of the deterrent system 100 is coated in a rubber or plastic material to provide a better grip for users installing the deterrent system 100. The front of the deterrent unit 100 includes a plurality of caps 404 including a spray nozzle 406. The spray nozzle 406 is in fluid communication with a canister (not shown) holding a spray material including, but not limited to, oleoresin capsicum, OC, capsaicin, and capsicum. Each cap 404 incorporates the same configuration as the covering device 300 and allows a user to unscrew the cap 404 to replace the associated canister. The nozzles 406 are selected to provide the desired coverage area for the spray. In one embodiment, the nozzles 406 are the same for all caps 404. In another embodiment, each cap 404 includes a different nozzle 406 type to provide different spray patterns. Each nozzle 404 includes a small valve (not shown) connected to the IO Unit 204 of the control board 200. When the valve is open, the nozzle 406 allows fluid to flow through the nozzle 406 and the flow is stopped when the valve is closed. In one embodiment, the control board 200 controls each nozzle 406 independent of another nozzle 406. In another embodiment, the nozzles 406 are controlled together. In another embodiment, the nozzles 406 are controlled in groups.

At least one speaker 408 and at least one microphone 410 are positioned onto the surface of the deterrent device 100. The microphone 408 may be connected to the IO Unit 204 of the control board 200 with the control board 200 converting the analog audio signal captured by the microphone into a digital audio signal that can be transmitted to a central monitoring station or can be analyzed by the control board 200. In one embodiment, the control board 200 analyzes the audio signals captured by each microphone 410 and determines whether the captured audio should initiate a spray event. In another embodiment, the control board 200 transmits the audio signal to a central location, such as a mobile application, where the audio can be played to a user. Consistent with this embodiment, after hearing the audio transmission, a user may engage the speakers 408 to transmit a message, either live or recorded, warning any potential targets of an imminent discharge of the nozzles 406. A camera 412 may be positioned at the center of the deterrent device 100 to provide live or recorded video to the user to assist in discharging the nozzles 406. In another embodiment, the control board 200 may analyze the video to determine if the nozzles should be discharged or if a warning message should be played by the speakers 408. In another embodiment, the camera 412 is a motion sensing device including, but not limited to, an infrared motion sensor.

Figure 5:
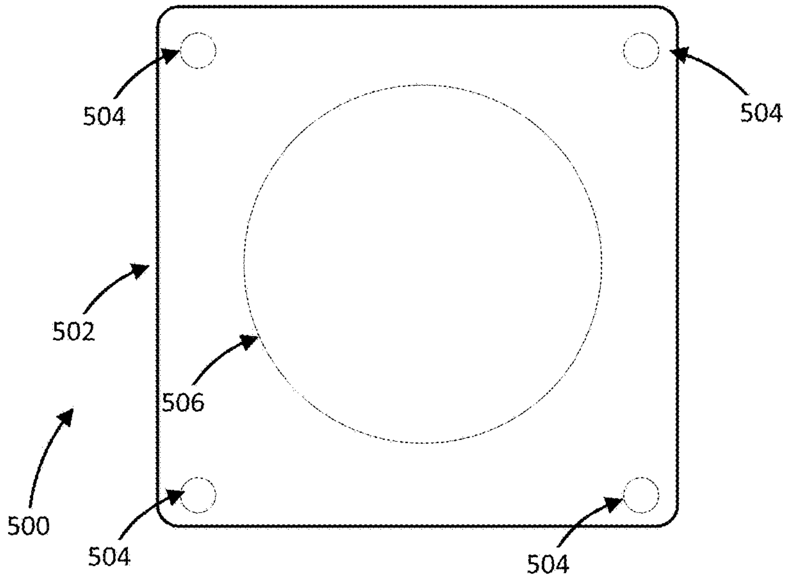
FIG. 5 depicts a mounting bracket for the deterrent device.

FIG. 5 depicts a mounting bracket 500 for the deterrent device 100. The mounting bracket 500 includes a plate 502 with a plurality of holes 504 around the periphery of the plate 502. A threaded ring 506 is formed in the center of the plate 502 to allow the back of the deterrent device 100 to engage the threads and secure to the plate 502 when mounted. The plate 502 may be made of any suitable material including metal or plastic. The depth of the threaded ring 506 may be 0.25 inches shorter than the thickness of the deterrent device 100 to allow for simplified installation.

Figure 6:
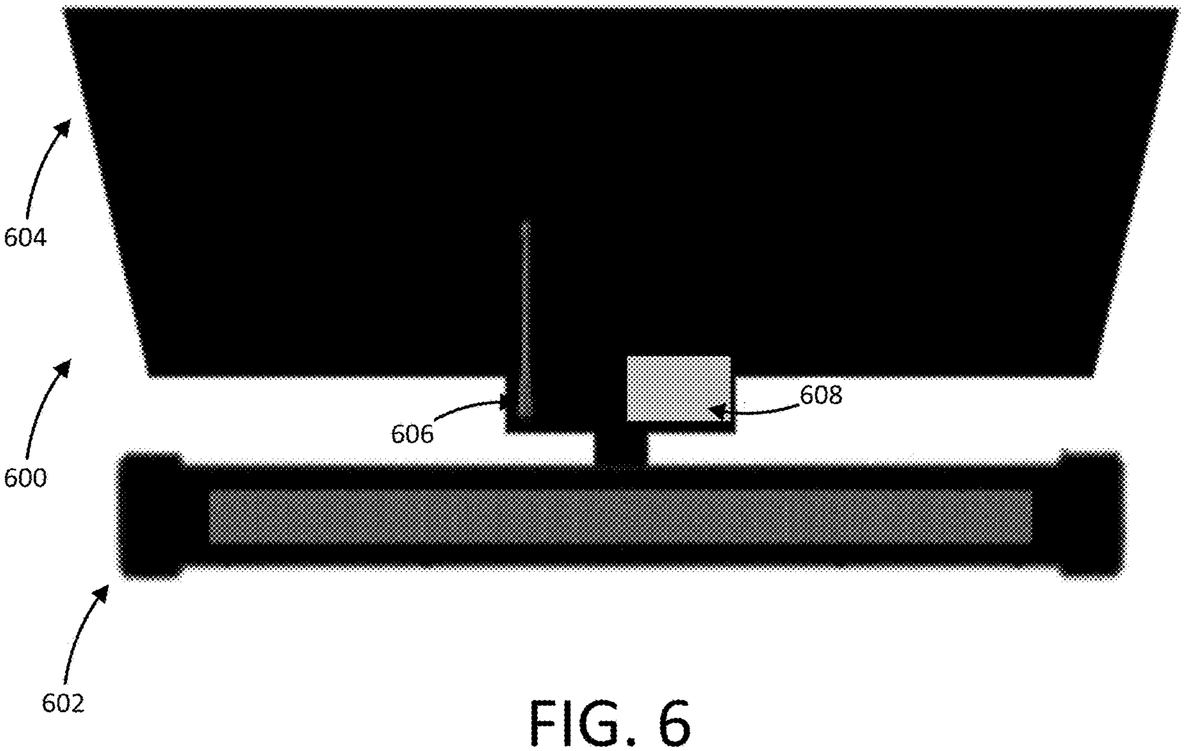
FIG. 6 depicts a rear view of another embodiment of a deterrent device.

FIG. 6 depicts a rear view of another embodiment of a deterrent device 600. The deterrent device 600 includes a bar 602 that encases the spray canisters and control board 200. The bar 602 is configured to mount to a structure to support the deterrent device 600. A power unit 604 is connected to the bar 602 with the power unit 604 having an antenna 606 and a mounting lock 608. The antenna 606 is connected to the communication unit 212 of the control board 200 and may communicate over a wireless network including a WiFi or cellular wireless network. The power unit 604 may be disconnected from the bar 602 by the mounting lock 608 with the mounting lock 608 requiring a key to open and disengage the bar 602.

Figure 7:
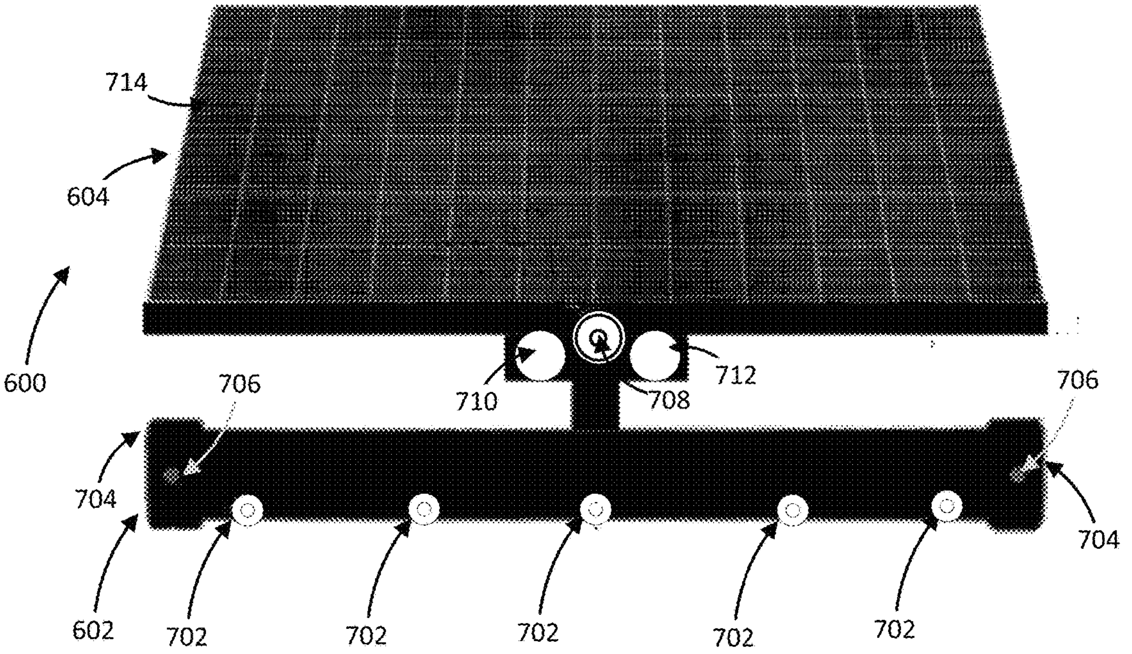
FIG. 7 depicts a front view of another embodiment of a deterrent device.

FIG. 7 depicts a front view of another embodiment of a deterrent device 600. The bar 602 includes a plurality of nozzles 702 inserted into openings along the front of the bar 602. The nozzles 702 are the same configuration as the nozzles and caps previously discussed herein. The bar 602 includes two end caps 704 positioned on the ends of the bar 602. The caps 704 are threaded and screw onto the bar 602. Each end cap 704 includes a security button 706 that is depressed to unscrew and remove the end cap 704. When an end cap 704 is unscrewed and removed from the bar 602 a cavity in the bar 602 is exposed allowing access to canisters of material connected to each end cap 704.

A camera 708 is positioned on a lower portion of the power unit 604 with a speaker 710 and a microphone 712 on opposing sides of the camera 708. The camera 708, speaker 710 and microphone 712 operate in the same manner as described previously. The power unit 604 includes a plurality of photovoltaic cells 714. The photovoltaic cells 714 convert sunlight into electricity which is used to charge batteries stored in the power unit 604.

Figure 8:
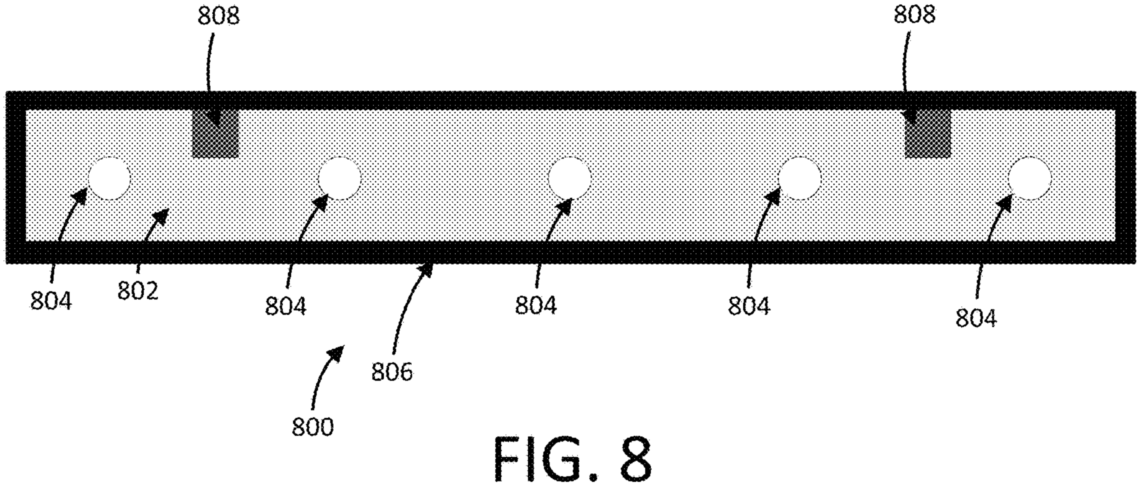
FIG. 8 depicts a mounting system for the deterrent device.

FIG. 8 depicts a mounting system 800 for the deterrent device 600. The mounting system 800 includes a mounting bracket 802. A plurality of holes 804 are formed through the mounting bracket 802 to secure the mounting bracket 802 to a surface 806. Two bolt units 808 are positioned on a top edge of the mounting bracket 802. The lower back section of the bar 602 includes a groove that is positioned on the mount at a forty-five degree angle. When the bar 602 is pushed inward, the two grooves on the bar 602 engage the bolting units 808 to secure the bar 602 on the mount.

Figure 9:
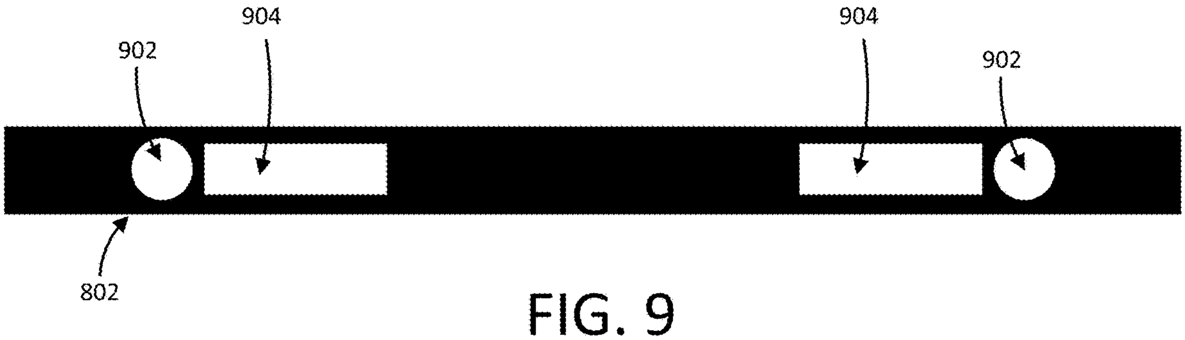
FIG. 9 depicts a top view of the mounting unit of FIG. 8.

FIG. 9 depicts a top view of the mounting unit 802. The mounting unit 802 includes locks 902 that must be unlocked to allow the bar 602 to be removed from the mounting unit 802. Once the locks 902 are unlocked, buttons 904 are pressed to move the bolting units 808 upward to disengage the bar 602 from the mounting unit 802.

Figure 10:
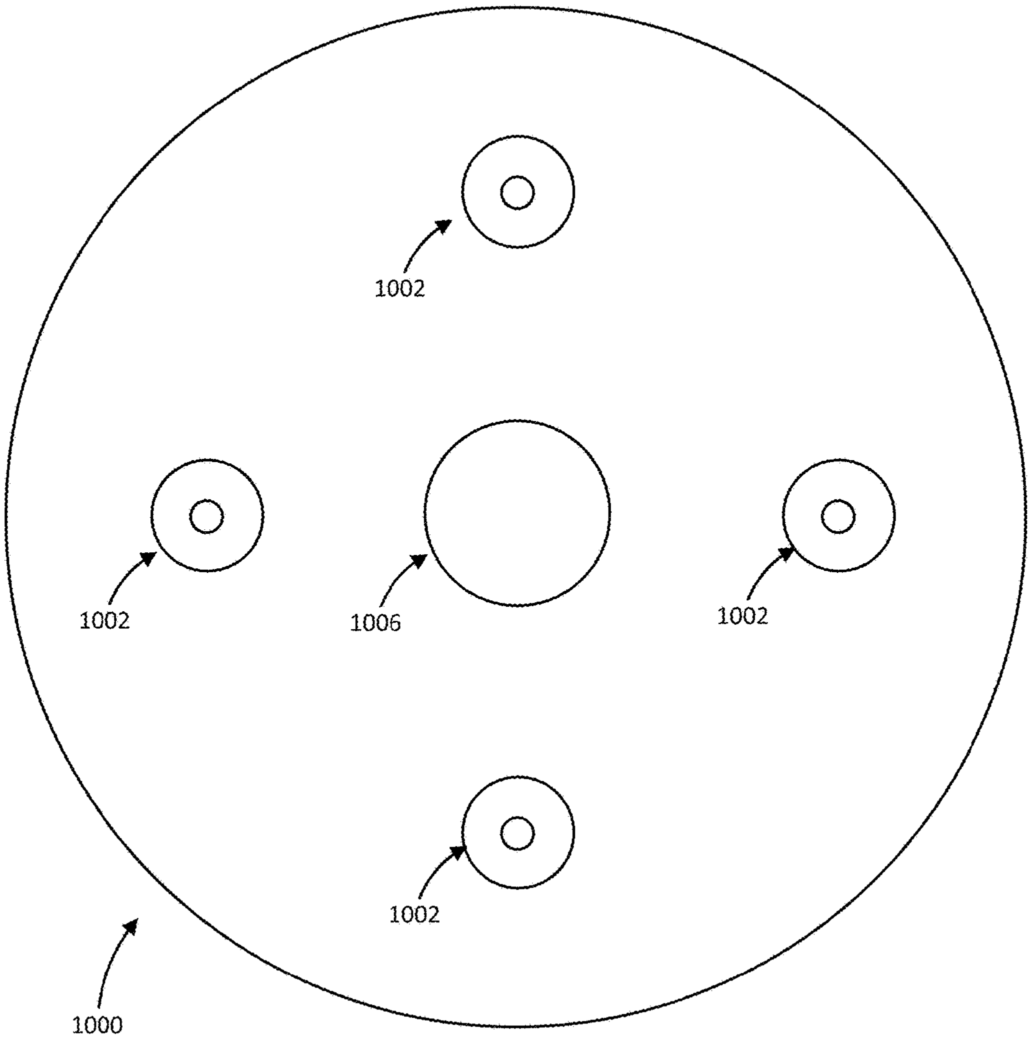
FIG. 10 depicts a front view of one embodiment of a deterrent device.

FIG. 10 depicts a front view of one embodiment of a deterrent device 1000. The deterrent device 1000 includes a plurality of nozzles 1002 positioned in openings in the front surface of the deterrent device 1000. The nozzles 1002 are configured and operate as previously described herein. A speaker 1004 is positioned in the center of the deterrent device 1000 to allow for playing of audio signals from the control board 200.

Figure 11:
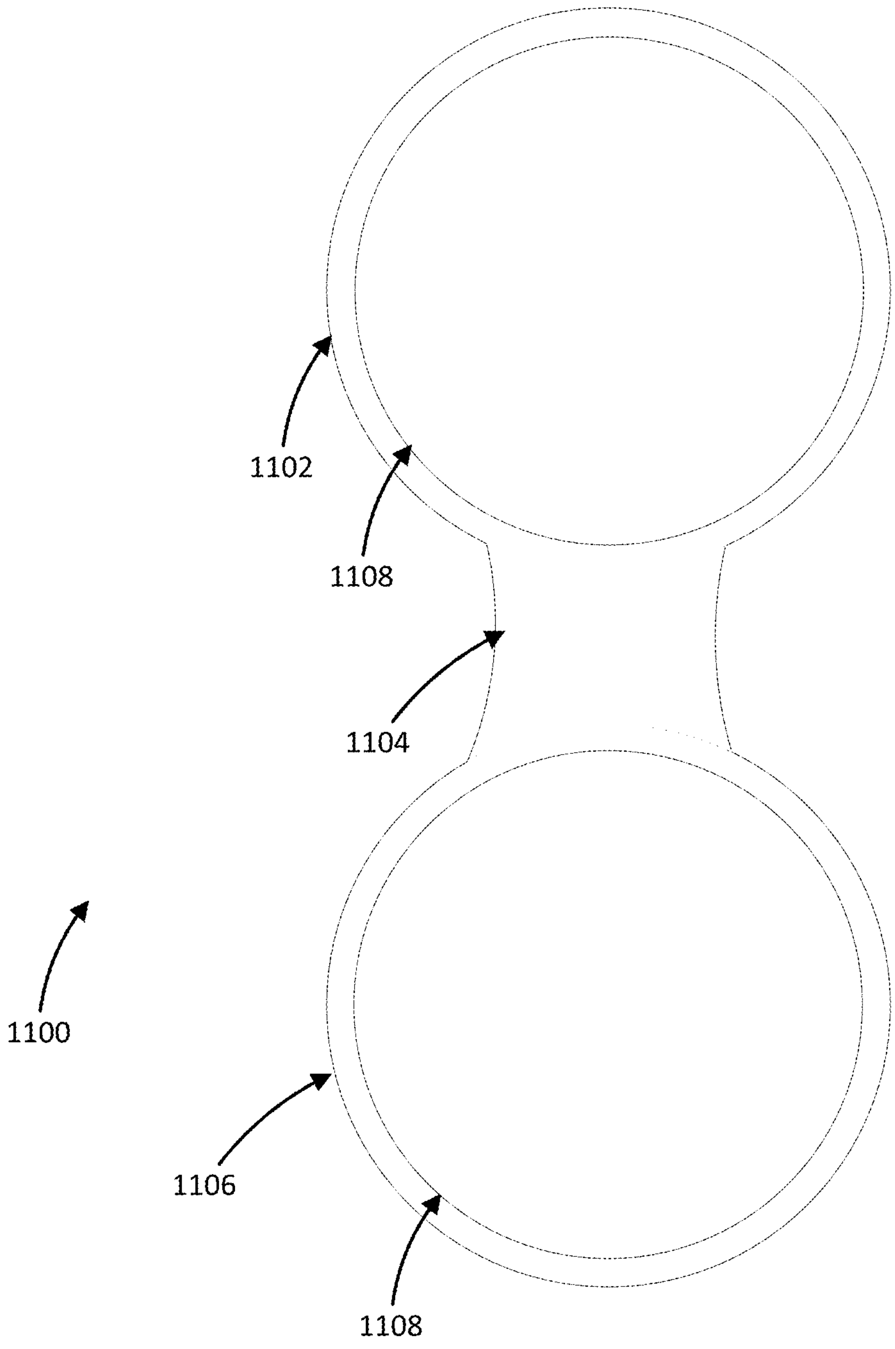
FIG. 11 depicts a front view of a deterrent device base unit capable of mounting the deterrent device of FIG. 10.

FIG. 11 depicts a front view of a deterrent device base unit 1100 capable of mounting the deterrent device of FIG. 10. The deterrent device 1100 includes an upper deterrent device base unit 1102, a connection portion 1104 and a lower deterrent device base unit 1106. The connection portion 1102 is flexible and is capable of bending such that the front surface of the upper deterrent base unit 1102 and lower deterrent base unit 1106 can be positioned parallel to one another. The upper deterrent base unit 1102 and lower deterrent base unit 1106 include threaded rings 1108 that are used to engage a threaded portion on the back of a deterrent unit 1000. The deterrent device base unit 1100 includes a neodymium magnet having padding on both sides of the magnet and a water resistant synthetic fiber covering the padding. One side of the deterrent device base unit 1100 includes a removable adhesive layer to adhere the unit to a structure.

Figure 12:
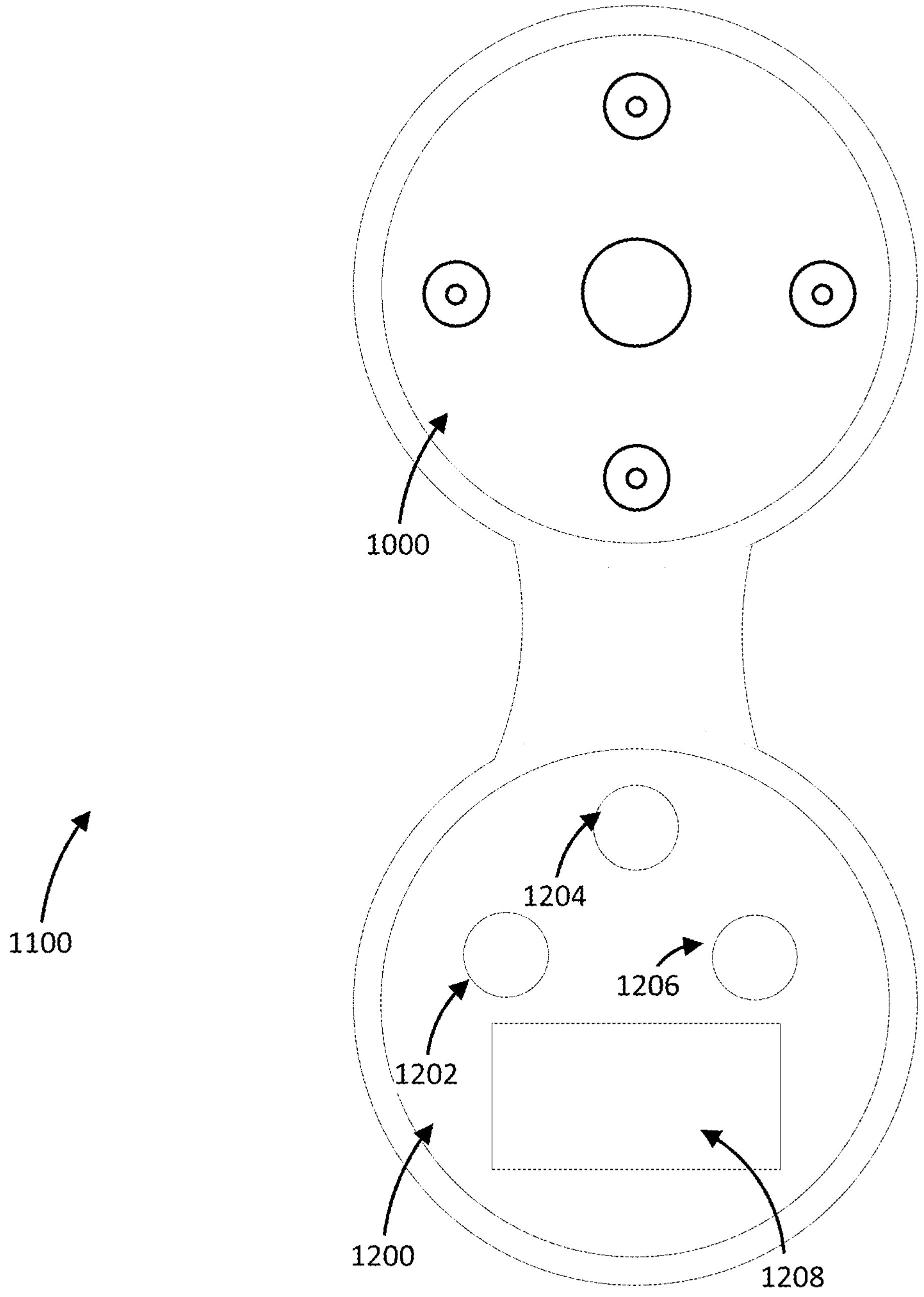
FIG. 12 depicts a front view of the deterrent device base unit with the deterrent device of FIG. 10 and a control unit mounted on the base unit.

FIG. 12 depicts a front view of the deterrent device base unit 1100 with the deterrent device of FIG. 10 and a control unit 1200 mounted on the base unit. The control unit 1200 includes a power switch 1202 connected to the control board 200 to turn the device on and off, a manual discharge button 1204 connected to the control board 200 to initiate the nozzles to spray material, and a Bluetooth connection button 1206 connected to the control board 200. A battery compartment 1208 holds batteries that power the control board 200 and related electronic systems.

Figure 13:
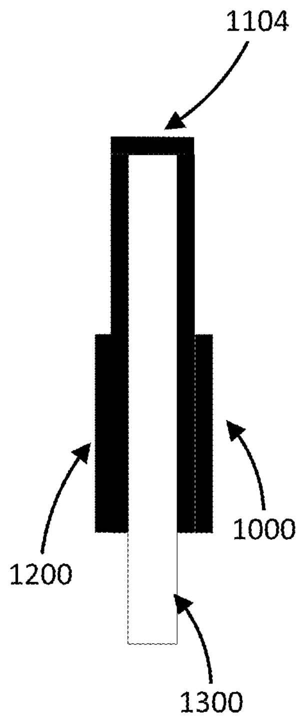
FIG. 13 depicts a side view of the deterrent system installed over a window.

FIG. 13 depicts a side view of the deterrent system 1100 installed over a window. The control unit 1200 is positioned on an interior side of the window 1300 with the connection portion placed over the top of the window 1300. The deterrent unit 1000 is placed on the exterior of the window 1300 with the nozzles facing outward. An operator in the interior side of the window can initiate a spray event from the nozzles using the buttons on the control unit. In one embodiment, the deterrent unit 1000 includes a motion sensor (not shown) that initiates a recorded sound when motion is detected and sprays a liquid from the nozzles if motion remains detected after the sound is played.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed:

1. A deterrent device comprising:

a device body comprising a front surface and a plurality of openings extending through the front surface;

a plurality of caps, wherein each cap of the plurality of caps is configured to be inserted into a corresponding opening of the plurality of openings, and wherein each cap of the plurality of caps comprises a spray nozzle and a valve;

a camera located at a center of the front surface, wherein the camera has a field of view;

at least one speaker located on the front surface;

at least one microphone located on the front surface; and a control unit in communication with the valve of each cap of the plurality of caps, the camera, the at least one speaker, and the at least one microphone, wherein:

the number of caps in the plurality of caps is equal to the number of openings in the plurality of openings, the control unit is configured to monitor the camera to detect motion within the field of view of the camera, the control unit is configured to play an audible sound when motion is detected, each cap of the at least one cap is in fluid communication with a canister containing a pressurized liquid, and the control unit is configured to open at least one valve of the plurality of caps to spray the pressurized liquid from the corresponding spray nozzle after the audible sound is played when motion is detected.

2. The deterrent device of claim 1, wherein the control unit converts audio captured from the microphone to a digital format.

3. The deterrent device of claim 2, wherein the control unit transfers the audio converted to a digital format to an external device via a communication unit in the control unit.

4. The deterrent device of claim 1, wherein the control unit transmits video from the camera to an external device via a communication unit.

5. The deterrent device of claim 1, further comprising a memory card slot capable of accepting a memory card for storage of information from the control unit.

6. The deterrent device of claim 1, wherein the audible sound is a recorded audio signal warning of a potential spray event.

7. The deterrent device of claim 1, wherein the control unit controls the at least one speaker to allow a user to speak through the at least one speaker via an external device.

8. The deterrent device of claim 1, further comprising a mounting bracket having a threaded ring that engages an interior threaded ring on a rear surface of the deterrent device.

9. The deterrent device of claim 1, further comprising a rubber coating applied to a periphery of the front surface.

10. A method of performing a deterrent action using a deterrent device, the method comprising:

providing the deterrent device comprising a device body having a front surface, a plurality of caps with each cap comprising a spray nozzle and a valve, a camera having a field of view, at least one speaker, at least one microphone, and a control unit, wherein the control unit is in communication with the camera, the at least one speaker, the at least one microphone, and each valve of the plurality of caps:

monitoring, via the control unit, for motion within the field of view of the camera, wherein the camera is located at a center of to the front surface;

playing, via the control unit, an audible sound from the at least one speaker when motion is detected within the field of view of the camera;

capturing, via the control unit, sound detected by the at least one microphone;

spraying a pressurized fluid from at least one spray nozzle of the plurality of caps, wherein each cap of the at least one cap is in fluid communication with a canister containing the pressurized liquid, and wherein the control unit is configured to open at least one valve of the plurality of caps to spray the pressurized liquid from the corresponding spray nozzle after the audible sound is played when motion is detected.

11. The method of claim 10, further comprising the step of converting audio captured from the at least one microphone to a digital format.

12. The method of claim 11, further comprising the step of transferring the audio converted to a digital format to an external device via a communication unit in the control unit.

13. The method of claim 10, further comprising the step of transmitting video from the camera to an external device via a communication unit.

14. The method of claim 10, further comprising the step of inserting a memory card into a memory card slot on the front surface for storage of information from the control unit.

15. The method of claim 10, wherein the audible sound is a recorded audio signal warning of a potential spray event.

16. The method of claim 10, further comprising the step of controlling the at least one speaker via the control unit to allow a user to speak through the at least one speaker via an external device.

17. The method of claim 10, wherein the deterrent device is mounted to a mounting bracket having a threaded ring that engages an interior threaded ring on a rear surface of the deterrent device.

18. The method of claim 10, wherein a rubber coating is applied to a periphery of the front surface.

* * * * *